United States Patent [19]

Iijima

[11] Patent Number: 4,985,615
[45] Date of Patent: Jan. 15, 1991

[54] PORTABLE ELECTRONIC APPARATUS HAVING KEY DATA FOR LIMITING MEMORY ACCESS

[75] Inventor: Yasuo Iijima, Yokohama, Japan
[73] Assignee: Kabushiki Kaisha Toshiba, Kawasaki, Japan
[21] Appl. No.: 397,200
[22] Filed: Aug. 23, 1989
[30] Foreign Application Priority Data Aug. 26, 1988 [JP] Japan .................................. 63-211832

[51] Int. Cl.$^5$ ............................................. G06K 19/06
[52] U.S. Cl. .................................... 235/492; 235/380; 235/487
[58] Field of Search ......................... 235/380, 487, 492

[56] References Cited
U.S. PATENT DOCUMENTS 4,734,568  3/1988  Watanabe ............................ 235/492

Primary Examiner—Harold Pitts
Attorney, Agent, or Firm—Cushman, Darby & Cushman

[57] ABSTRACT

An IC card has a first type of key data used for an access enable/disable judgement for a common data file and all of the application data files, and a second type of key data used for an access enable/disable judgment for a specific application data file and the common data file. A storage section for storing key data registered for the common data file and a storage section for storing a collation result of key data registered for the application data files are separately arranged. Upon selection of an application data file, when an application data file different from the currently selected application data file is selected, the latter collation result is set in a non-collation status. Therefore, key data is effective only when a corresponding application is selected.

4 Claims, 10 Drawing Sheets

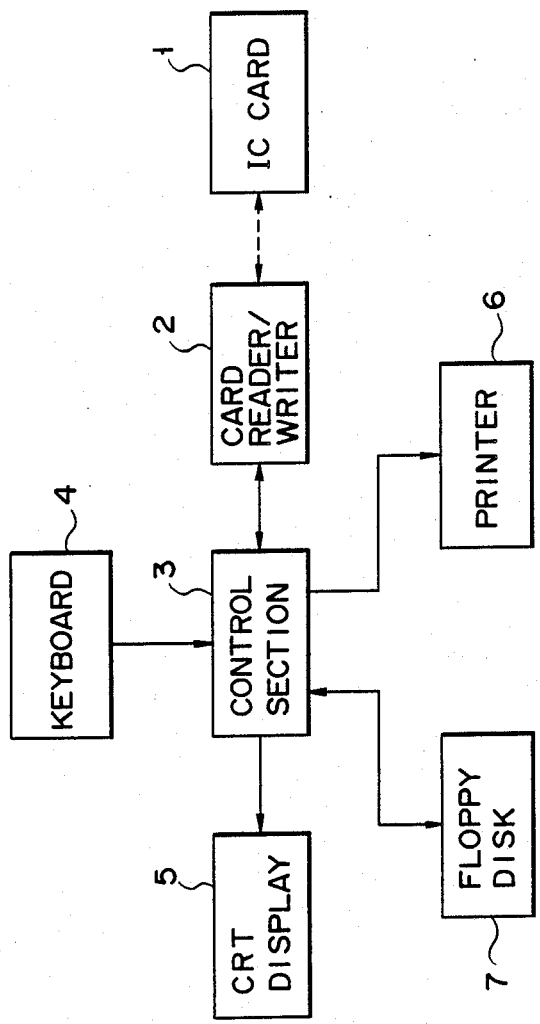
F I G. 1

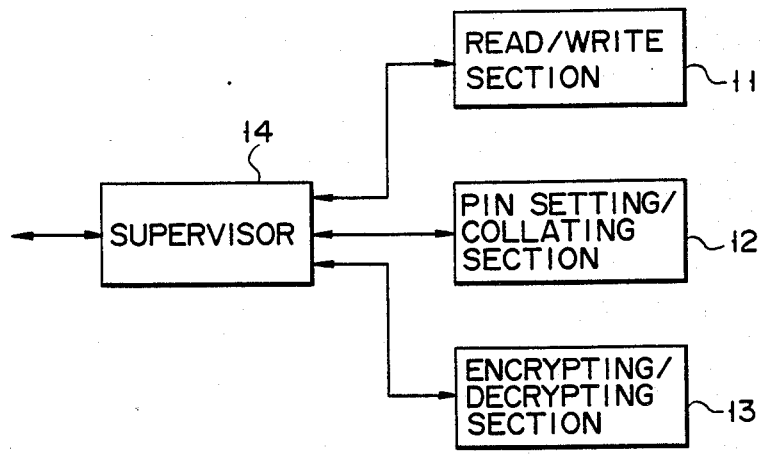
F I G. 2
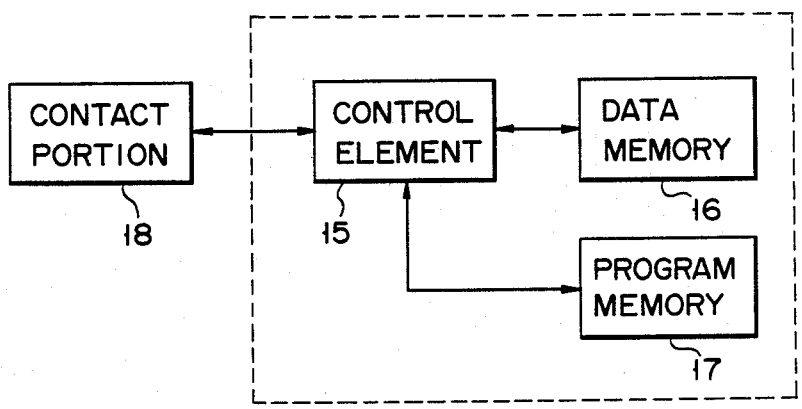
F I G. 3

FIG. 4

| | | | | |
|---|---|---|---|---|
| KID01 | KEYDATA 1 | 10000000 | AIDgg | AREA G | 10000000 A / 10000000 A |
| KID02 | KEYDATA 2 | 01000000 | AIDhh | AREA H | 10000000 A / 01000000 A |
| KID03 | KEYDATA 3 | 00100000 | | | |

21

DFN = XXX

| KID04 | KEYDATA X4 | 00010000 | AIDaa | AREA A | 10000000 A / 10010000 A |
| KID05 | KEYDATA X5 | 00001000 | AIDbb | AREA B | 10000000 A / 00000000 O |
| KID06 | KEYDATA X6 | 00000100 | AIDcc | AREA C | 00000000 A / 00001100 O |

22₁

DFN = YYY

| KID04 | KEYDATA Y4 | 00010000 | AIDdd | AREA D | 10000000 A / 10010000 A |
| KID05 | KEYDATA Y5 | 00001000 | AIDee | AREA E | 10000000 A / 00010000 O |
| KID06 | KEYDATA Y6 | 00000100 | AIDff | AREA F | 10000000 A / 00001000 O |

22₂

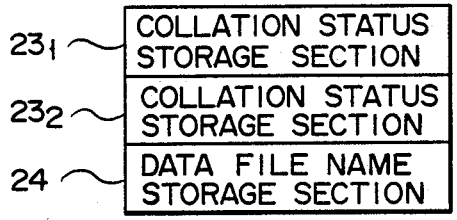
FIG. 5
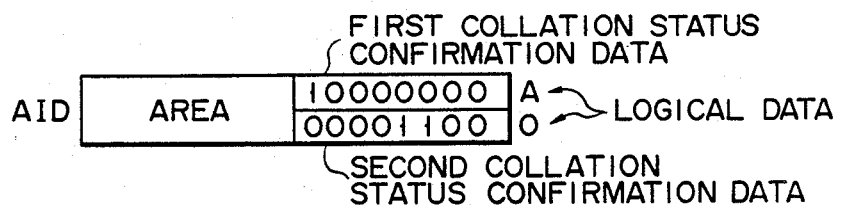
FIG. 6
FIG. 7
FIG. 8

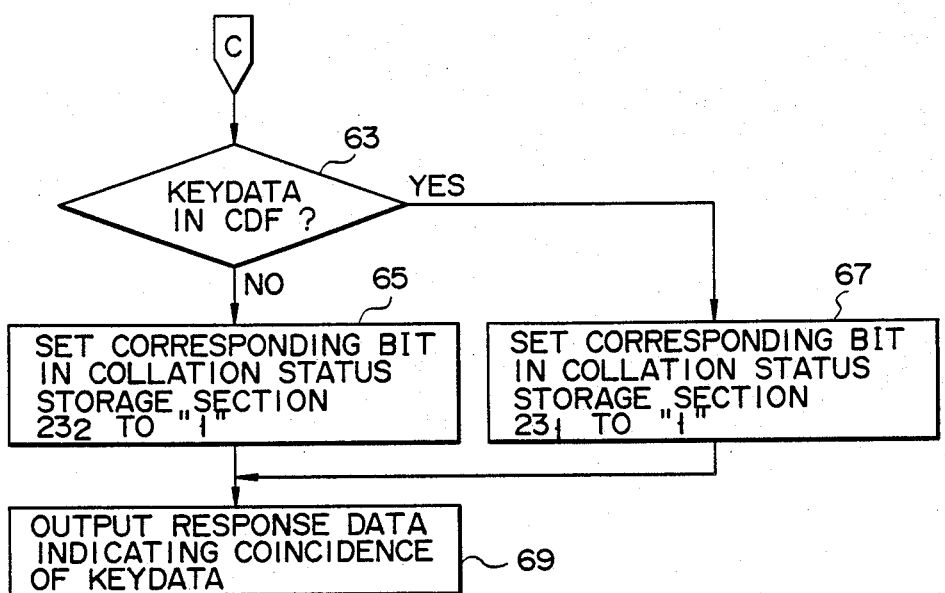
FIG. 9C
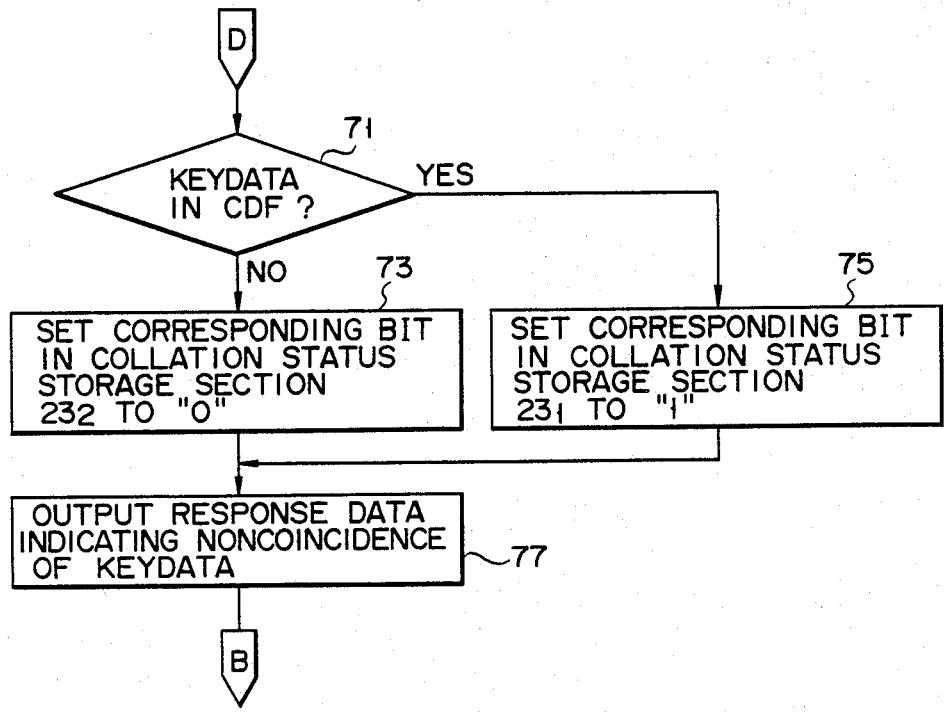

PORTABLE ELECTRONIC APPARATUS HAVING KEY DATA FOR LIMITING MEMORY ACCESS

BACKGROUND OF THE INVENTION

1. Field of the Invention

The present invention relates to a portable electronic apparatus, known as an integrated circuit card (IC card), which incorporates an IC chip having, e.g., a nonvolatile memory and a control element such as a CPU.

2. Description of the Related Art

A so-called IC card which incorporates an IC chip having, e.g., a nonvolatile memory and a control element such as a CPU has been developed as a portable storage medium. An IC card of this type stores an identification number as key data in its internal memory. When an identification number is externally input, it is collated with the registered identification number stored in the memory, and subsequent memory access is enabled or disabled in accordance with the collation result. In this case, since the identification number in the memory cannot be externally read out, only a person who knows the identification number can access the memory.

As various IC cards have become available, a method of managing a memory in an IC card has been improved. The memory is divided by the concept of a single command data file (first region) accessed in all the applications and a plurality of application data files (second regions) accessed in units of applications. The data files corresponding to the applications are selectively accessed.

However, when corresponding identification numbers are provided in units of application files, as the number of application files is increased, the information indicating whether each of the identification numbers is collated is also increased. For this reason, in a conventional IC card, an identification number common to the common data file and the application data files is merely set. Thus, it is difficult to maintain security as an IC card system.

SUMMARY OF THE INVENTION

It is an object of the present invention to provide a portable electronic apparatus which can set different key data in correspondence with a plurality of application data files accessed in units of applications, and which allows flexible design while maintaining security as a system.

According to a first aspect of the present invention, a portable electronic apparatus comprises: a memory comprising a first region which can be accessed in all the applications and second regions which are selectively accessed in accordance with an application; Control means for accessing the memory and selectively exchanging data with an external device; a key data storage section of the memory for storing a plurality of key data; first means for causing at least one first key data of the plurality of key data to determine an access enable/disable judgement for the first region and all of the second regions; and second means for causing at least one second key data of the plurality of key data to determine an access enable/disable judgement for the first region and a specific region of the second regions.

According to the first aspect of the present invention, a plurality of key data are stored in the apparatus. At least one key data is used for an access enable/disable judgement for a common data file (first region) and all of the application data files (second regions), and at least one another key data is used for an access enable/disable judgement for a specific application data file and the common data file. Thus, different key data can be set in correspondence with the plurality of application data files. Therefore, a flexible design is allowed while maintaining security within a system.

According to a second aspect of the present invention, a portable electronic apparatus comprises: a memory comprising a first region which can be accessed in all the applications and a plurality of second regions which are selectively accessed in accordance with an application; control means for accessing the memory means and selectively exchanging data with an external device; a key data storage section of the memory for storing a plurality of key data; first and second collation means for collating at least one first key data and at least one second key data of the plurality of key data, respectively; first and second storage means for storing collation results generated by the respective first and second collation means; means for determining, on the basis of the collation results stored in the first and second storage means, whether the memory means can be accessed; and means for setting the collation result stored in the second storage means in a non-collation status when one of the plurality of second regions is selected.

According to the second aspect of the present invention, a storage section for a collation result of data registered for the common data file is kept separate from a storage section for storing a collation result of key data registered for the application data file. When an application data file is selected, the collation result of key data registered for the application data file is set in a non-collation status, so that a plurality of applications are simultaneously executed. In addition, if key data are set in correspondence with applications, given key data is effective for an access only when a corresponding application is selected. Thus, security among applications can be assured.

BRIEF DESCRIPTION OF THE DRAWINGS

FIG. 1 is a block diagram showing an arrangement of a portable electronic apparatus of the present invention and a handling terminal device;

FIG. 2 is a block diagram showing functions of an IC card shown in FIG. 1;

FIG. 3 is a block diagram showing an arrangement of the IC card shown in FIG. 1;

FIG. 4 shows a file structure of a data memory shown in FIG. 3;

FIG. 5 is a view for explaining identification data for key data;

FIG. 6 is a view for explaining a collation status storage section and a data file name storage section;

FIG. 7 is a view for explaining identification data for an area;

FIG. 8 is a view for explaining data table storing selection data for selecting collation status confirmation data in correspondence with various instruction codes;

FIGS. 9A through 9E are flow charts for explaining processing operations;

DETAILED DESCRIPTION OF THE PREFERRED EMBODIMENT

Figure 9A:
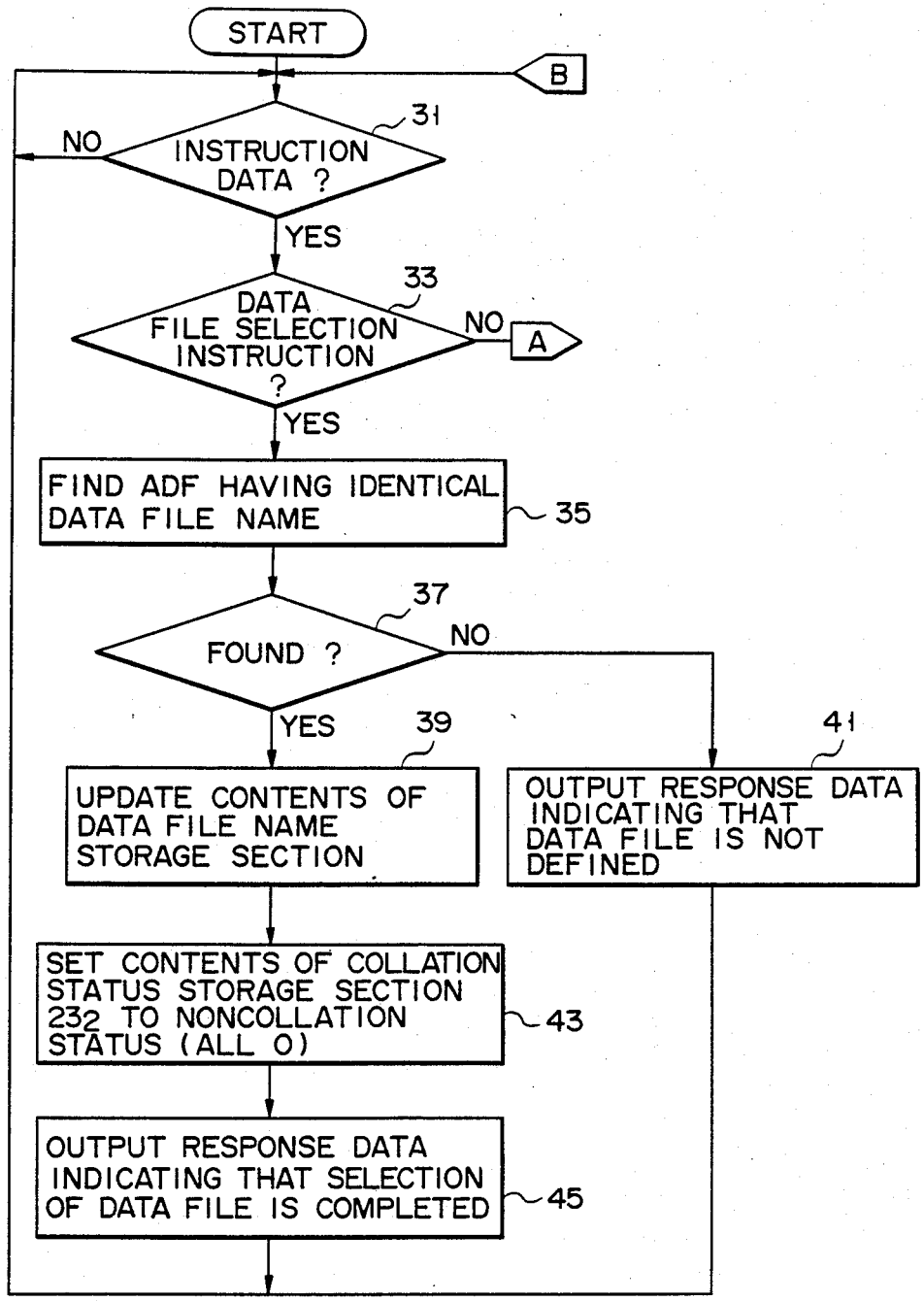

An embodiment of the present invention will be described below with reference to the accompanying drawings.

FIG. 1 shows an IC card as a portable electronic apparatus according to the present invention, and a terminal device handling the IC card. An IC card 1 can be connected to a control section 3 comprising, e.g., a CPU through a card reader/writer 2. The control section 3 is connected to a keyboard 4, a CRT display 5, a printer 6, and a floppy disk device 7. The IC card is held by a user, and is used for referring to key data (identification number) known by the user upon purchasing of commodity and storing necessary data. FIG. 2 shows function blocks of the IC card. The IC card is made up of sections for executing basic functions, i.e., a read/write section 11, a PIN setting/collating section 12, and an encrypting/decrypting section 13, and a supervisor 14 for managing these basic functions.

The read/write section 11 has a function of reading, writing, or deleting data with respect to a data memory.

The PIN setting/collating section 12 has a function of performing storage and readout inhibition processing operations of an identification number set by the user, and a function of collating the identification number after the identification number is set to permit the subsequent processing.

The encrypting/decrypting section 13 has a function of encrypting data in order to prevent disclosure or forgery of communication data when data is transmitted from the control section 3 to another terminal device through a communication line, and of decrypting the encrypted data. For example, the section 13 has a function of performing data processing in accordance with an encryption algorithm having a sufficient encryption strength, such as the DES (Data Encryption Standard).

The supervisor 14 has a function of decoding a function code input from the card reader/writer 2 or a function code added with data, and selecting and executing a necessary one of the basic functions.

In order to realize these functions, as shown in FIG. 3, the IC card 1 comprises a control element (control section) 15 such as a CPU, a data memory (memory section) 16, a program memory 17, and a contact portion 18 for obtaining an electrical contact with the card reader/writer 2. Of these components, the control element 15, the data memory 16, and the program memory 17 are constituted by a single IC chip (or a plurality of IC chips), and are embedded in an IC card main body.

The program memory 17 comprises, e.g., a mask ROM, and stores a control program and the like of the control element 15 having subroutines for realizing the above-mentioned basic functions.

The data memory 16 comprises, e.g., a programmable nonvolatile memory such as an EEPROM, used for storing various data.

As shown in FIG. 4, data memory 16 is constituted by a common data file (first region) 21 accessed in all the applications and a plurality of (two in FIG. 4) application data files (second regions) $22_1$ and $22_2$ accessed in units of applications. Each of the data files 21, $22_1$, and $22_2$ stores a plurality of key data (identification number), and includes a plurality of areas.

A data file name (DFN) is given to each of the application data files $22_1$ and $22_2$. When a data file name is designated using key data file selection instruction data (to be described later), an application data file to be accessed is recognized.

Identification data (KID) for designating key data is given to each key data, as shown in FIG. 5. When identification data is designated using key data collation instruction data (to be described later), key data to be subjected to collation processing is recognized.

In FIG. 4, identification data KID01, KID02, and KID03 are given to key data 1, 2, and 3 belonging to the common data file 21. Identification data KID04, KID05, and KID06 are given to key data X4, X5, and X6 belonging to the application data file $22_1$. Identification data KID04, KID05, and KID06 are also given to key data Y4, Y5, and Y6 belonging to the application data file $22_2$. Collation status designation data is given to each key data, as shown in FIG. 5. The collation status designation data is used to identify whether key data necessary for subsequent access has already been collated.

Data indicating whether or not key data has already been collated is stored in collation status storage sections $23_1$ and $23_2$ shown in FIG. 6. The collation status storage sections $23_1$ and $23_2$ are allocated in a RAM incorporated in, e.g., the control element 15. Key data belonging to the common data file 21 have their corresponding collation status designation data stored in the collation status storage section $23_1$, and key data belonging to the application data files $22_1$ and $22_2$ have their corresponding collation status designation data stored in the collation status storage section $23_2$.

As shown in FIG. 6, a data file name storage section 24 is allocated together with the collation status storage sections $23_1$ and $23_2$. The data file name storage section 24 stores a data file name of the data file selected as an object to be accessed by data file selection instruction data (to be described later).

As shown in FIG. 7, identification data (AID) for designating an area is given to each area. Therefore, when the identification data is designated using area processing instruction data (to be described later), an area serving as an object of area processing can be recognized.

In FIG. 4, identification data AIDgg and AIDhh are given to areas G and H belonging to the common data file 21. Identification data AIDaa, AIDbb, and AIDcc are given to areas A, B, and C belonging to the application data file $22_1$. Identification data AIDdd, AIDee, and AIDff are given to areas D, E, and F belonging to the application data file $22_2$.

Each area has corresponding first and second collation status confirmation data, as shown in FIG. 7. Logical data (A or 0) are given to these first and second collation statuses confirmation data. The first and second collation status confirmation data request collation statuses of key data necessary in an area access. The logical data indicates whether a combination of the collation status confirmation data is an AND or OR logic. In the case of the AND logic, the logical data is set to be "A", and in the case of the OR logic, it is set to be "O".

FIG. 8 shows a data table for selecting the two collation status confirmation data assigned to each area in units of instruction codes. The data table stores selection data for selecting the collation status confirmation information in correspondence with various instruction codes, and this data table is allocated in, e.g., the data memory 16.

The embodiment of the portable electronic apparatus according to the present invention will be described below with reference to the flow charts shown in FIGS. 9A through 9F. On the flow charts, the common data file 21 is abbreviated as CDF, and the application data file $22_1$ or $22_2$ is abbreviated as ADF.

Figure 10:
FIG. 10 shows a format of data file selection instruction data.

Data file selection processing will be described below with reference to the flow chart shown in FIG. 9A. In a steady state, the control waits for instruction data. If instruction data is input in step 31, the control element 15 checks in step 33 if the input instruction data is a data file selection instruction shown in FIG. 10. If NO in step 33, the flow advances to step 47, and the control element 15 executes another processing.

If YES in step 33, the control element 15 finds an application data file having identical data file name to that in this instruction data from the data memory 16 in step 35. If no such file is found in step 37, the control element 15 outputs response data indicating that the data file is not defined in step 41, and the flow returns to the instruction data standby state in step 31.

If YES in step 37, the control element 15 stores the data file name in this instruction data in the data file name storage section 24 in FIG. 6 in step 39, and sets the content of the collation status storage section $23_2$ in a non-collation status, i.e., sets all the bits to be "0" in step 43. The control element 15 outputs response data indicating that the selection of the data file is completed, in step 45, and the flow then returns to the instruction data standby state in step 31.

When the IC card is started, the contents of the storage sections $23_1$ and $23_2$ in FIG. 6 are all "0"s. In this case, if data file selection instruction data having a data file name "xxx" is input, a value "xxx" is stored in the data file name storage section 24.

Figure 9B:
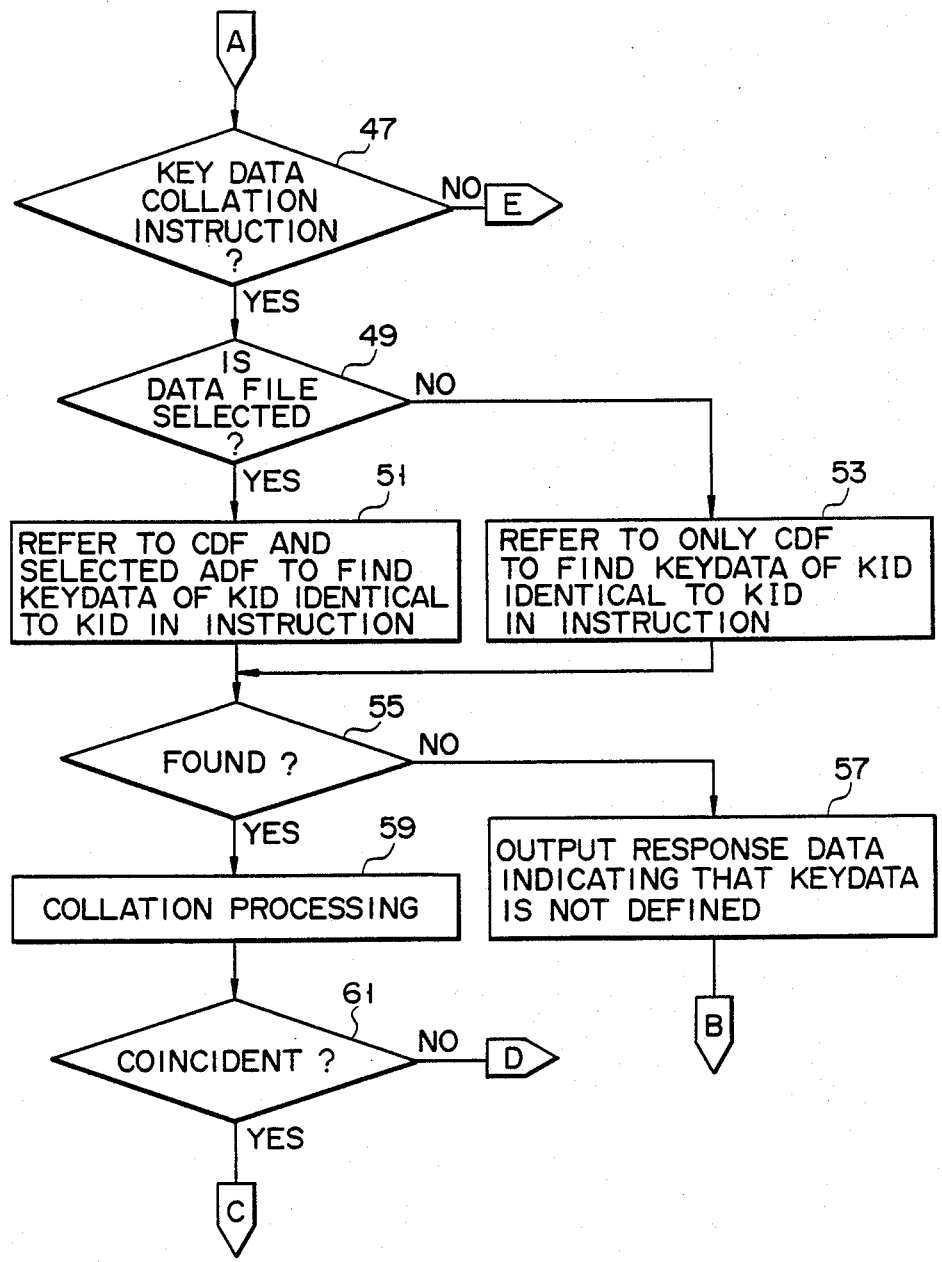
Figure 11:
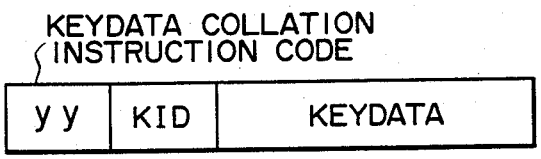
FIG. 11 shows a format of key data collation instruction data.

Key data collation processing will be described below with reference to the flow charts shown in FIGS. 9B and 9C. If it is determined in step 33 that the input instruction data is not the data file selection instruction data, the control element 15 checks in step 47 if the input instruction data is a key data collation instruction shown in FIG. 11. If NO in step 47, the flow advances to step 79, and the control element 15 executes another processing.

If YES in step 47, the control element 15 checks in step 49 if the content of the data file name storage section 24 is all "0"s (whether or not the data file is selected). If it is determined in step 49 that the content is all "0"s, this means that no data file is selected, and the control element 15 refers to the common data file in step 53 to find key data having identical identification data (KID) to that in the input instruction data in step 55. If it is determined in step 49 that the content of the data file name storage section 24 is not all "0"s, this means that a data file is selected. Therefore, the control element 15 refers to the common data file 21 and the selected one of the application data files $22_1$ and $22_2$ in step 51 to find key data having identical identification data to that in the input instruction data in step 55. If NO in step 55, the control element 15 outputs in step 57 response data indicating that the key data is not defined, and the flow returns to the instruction data standby state in step 31.

If YES in step 55, the control element 15 collates the found key data and key data in the input instruction data in step 59.

As a result of collation in step 61, if a coincidence is found between the two key data, the control element 15 checks in step 63 if the key data belongs to the common data file 21 or the application data file $22_1$ or $22_2$. If it is determined in step 63 that the key data belongs to the common data file 21, the control element 15 refers to collation status designation data given to the key data, and sets a bit of the collation status storage section $23_1$ corresponding to a bit "1" of the designation data to be "1" in step 67. If it is determined in step 63 that the key data belongs to the application data file, the control element 15 similarly sets a bit of the collation status storage section $23_2$ corresponding to a bit "1" of the designation data to be "1". In step 69, the control element 15 outputs response data indicating the coincidence of the key data, and the flow returns to the instruction data standby state.

As a result of collation in step 61, if a non-coincidence is found between the key data, the control element 15 similarly sets a corresponding bit of the collation status storage section $23_1$ or $23_2$ to "0" in step 65. In step 69, the control element 15 outputs response data indicating a noncoincidence of the key data, and the flow returns to the instruction data standby state.

For example, when key data 1 and key data Y5 and Y6 are collated after the application data file $22_2$ is selected by the data file selection instruction data, the content of the collation status storage section $23_1$ is set to be "10000000", the content of the collation status storage section $23_2$ is set to be "00001100", and the content of the data file name storage area 24 is set to be "YYY". When the application data file $22_1$ is selected thereafter, the content of the collation status storage section $23_1$ is left unchanged, the content of the collation status storage section $23_2$ is set to be "00000000", and the content of the data file name storage section 24 is set to be "xxx".

Figure 9D:
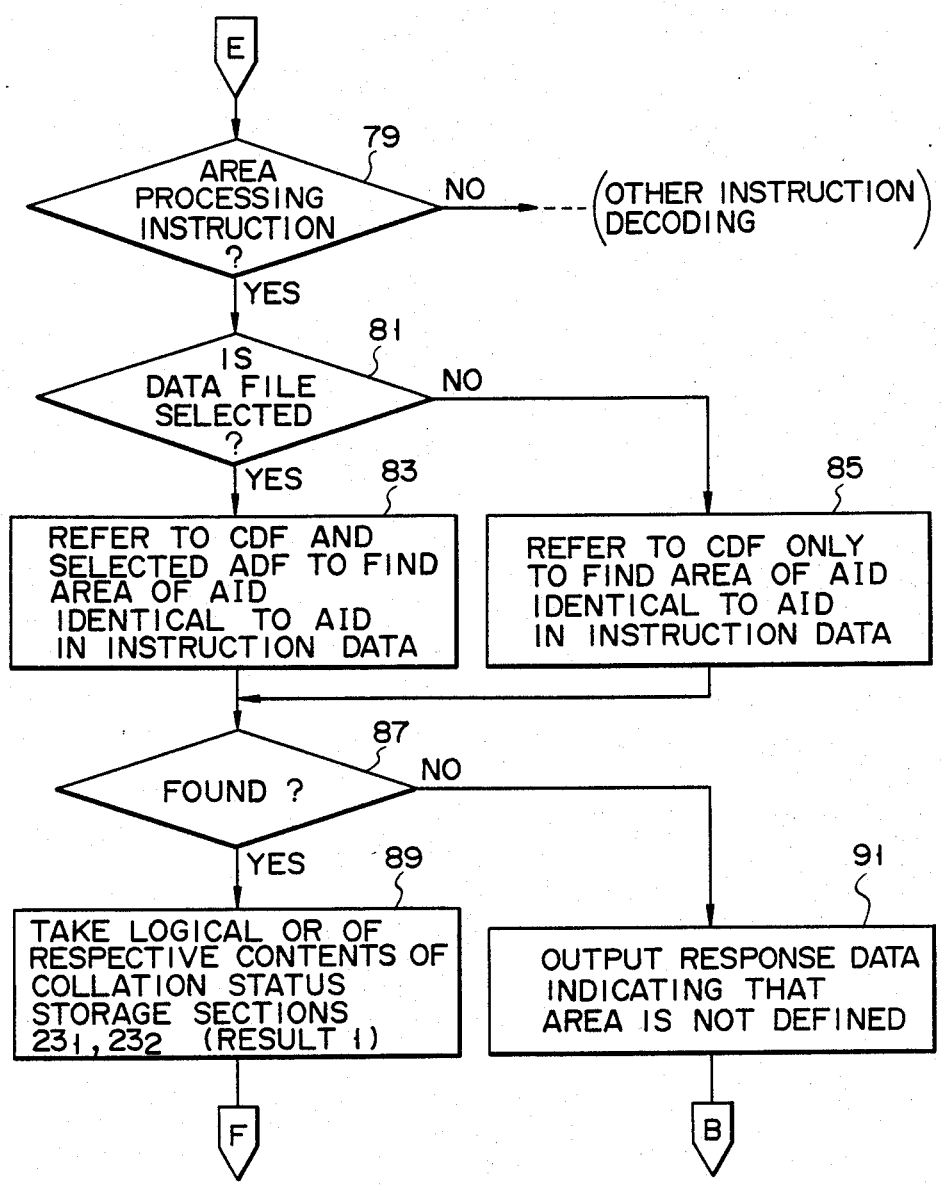
Figure 9E:
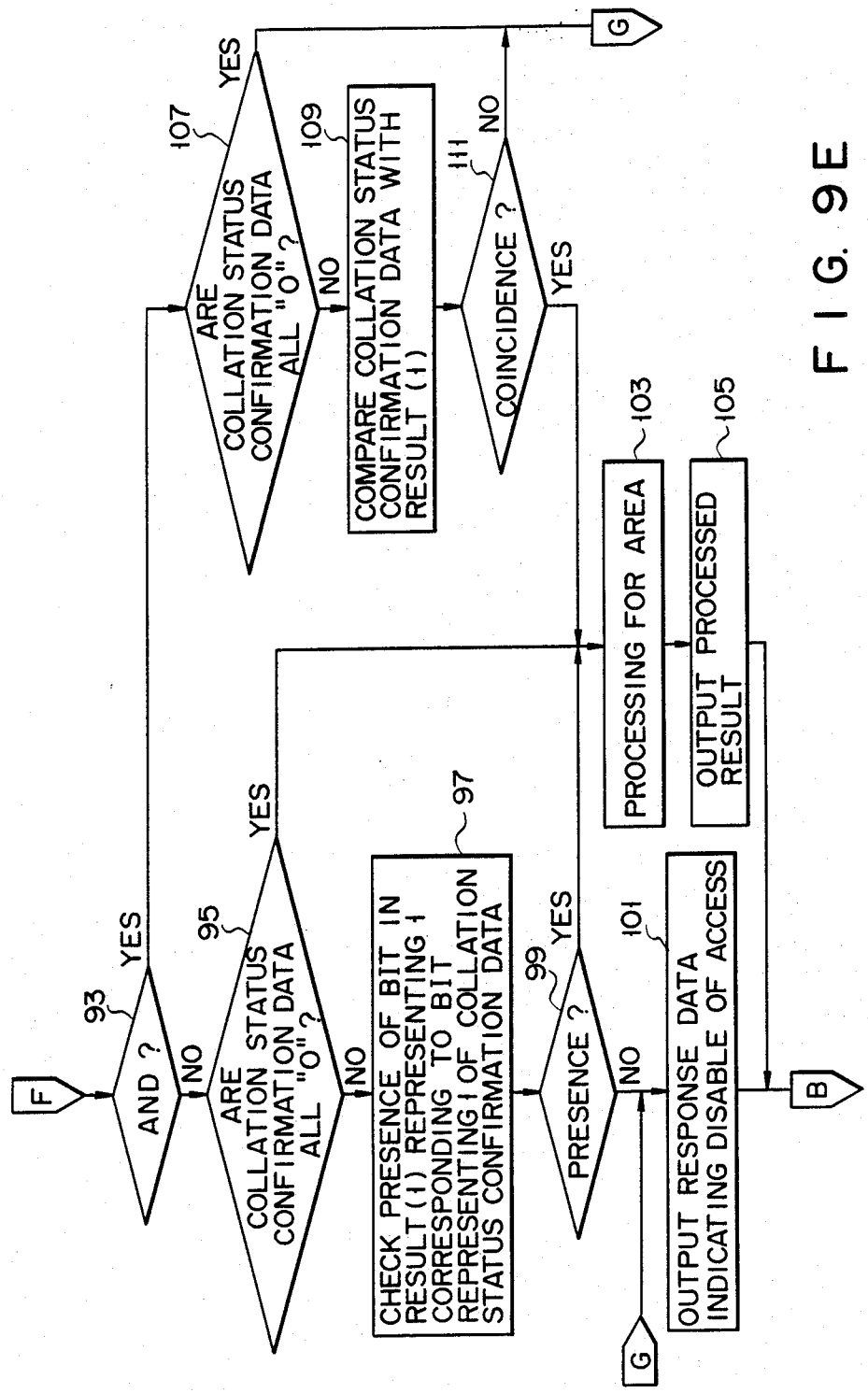
Figure 12A:
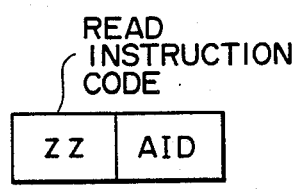
FIG. 12A shows a format of read instruction data to an area.
Figure 12C:
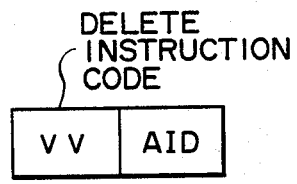
FIG. 12C shows a format of delete instruction data to an area.
Figure 12B:
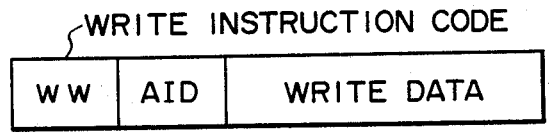
FIG. 12B shows a format of write instruction data to an area.

Next, area processing (data read, write, and delete processing in an area) will be described below with reference to the flow charts shown in FIGS. 9D and 9E. If it is determined in step 47 that the input instruction data is not the key data collation instruction data, the control element 15 checks in step 79 if the input instruction data is read instruction data shown in FIG. 12A, write instruction data shown in FIG. 12B, or delete instruction data shown in FIG. 12C. If NO in step 79, the control element 15 executes another processing.

If YES in step 79, the control element 15 checks in step 81 if the content of the data file name storage section 24 is all "0"s (whether or not the data file is selected). If it is determined in step 81 that the content is all "0"s, this means that no data file is selected, and the control element 15 refers to the common data file 21 and the selected one of the application data files $22_1$ and $22_2$ to find an area having identical identification data (AID) to that in the input instruction data in step 85.

If it is determined in step 81 that the content is not all "0"s, this means that a data file is selected. Therefore, the control element 15 refers to the common data file 21 and the selected one of the application data files $22_1$ and $22_2$ to find an area having identical identification data (AID) to that in the input instruction data in step 83. If no such area is found in step 87, the control element 15 outputs response data indicating that an area is not defined, in step 91, and the flow returns to the instruction data standby state.

If YES in step 87, the control element 15 takes a logical OR of the contents of the collation status storage sections $23_1$ and $23_2$ in step 89, and sets the OR result as "result 1".

The control element 15 searches for an identical instruction code to that in the input instruction data from the data table shown in FIG. 8 to select two collation status confirmation data assigned to each area. If the area processing instruction data is read instruction data, since its instruction code is "zz", the first collation status confirmation data is selected by corresponding selection data "1"; if it is write instruction data, since its instruction code is "ww", the second collation status confirmation data is selected by corresponding selection data "2"; and if it is delete instruction data, since its instruction code is "vv", the second collation status confirmation data is selected by corresponding selection data "2".

When the first or second collation status confirmation data is selected in this manner, the control element 15 refers to the selected collation status confirmation data in step 93 to check if the logical data added thereto is an AND logic. If NO in step 93 (if an OR logic is selected), the control element 15 checks in step 95 if the bits of the collation status confirmation data are all "0"s. If YES in step 95, the control element 15 does not confirm the collation status and executes processing for the area in step 103.

If it is determined in step 95 that any bit is "1", the control element 15 checks in step 97 if a bit in the result 1 corresponding to the bit "1" is set to be "1". As a result of step 97, if none of bits is "1", the control element 15 outputs response data indicating disable of access in step 101, and the flow returns to the instruction data standby state. As a result of step 97, if any bit is "1", the control element performs processing for the area in step 103.

If YES in step 93, the control element 15 similarly checks in step 107 if the content of the collation status confirmation data is all "0"s. If YES in step 107, the control element 15 determines that an access to the corresponding area is disabled, and outputs response data indicating disable of access in step 101. The flow then returns to the instruction data standby state.

If it is determined in step 107 that any bit is "1", the control element 15 compares this collation status confirmation data with the result 1. If it is determined in step 111 that a noncoincidence is found between these data, the control element 15 outputs response data indicating disable of access in step 101, and the flow returns to the instruction data standby state in step 31. If it is determined in step 111 that a coincidence is found between the two data, the control element 15 performs processing for the area in step 103. After the processing, the control element 15 outputs the processing result as response data in step 105, and the flow then returns to the instruction data standby state in step 31.

More specifically, in FIG. 4, for an area B, the logical data of the first collation status confirmation data added to the area B indicates an AND logic "A", and the first collation status confirmation data is "10000000". Therefore, a read access to the area B can be enabled after only the key data 1 is collated. The second collation status confirmation data is "00000000", and its logical data indicates an OR logic "0". Therefore, write and read accesses to the area B can be performed without collation of key data.

For an area C, the first collation status confirmation data is "00000000", and its logical data indicates an AND logic "A". Therefore, a read access to the area C is disabled. The second collation status confirmation data is "00001100", and its logical data indicates an OR logic "O". Therefore, after one of the key data X5 or X6 is collated, write and delete accesses to the area C are enabled.

After collation of the key data Y5 and Y6, when the application data file $22_1$ is selected to execute a write access to the area C, the collation statuses of the key data Y5 and Y6 are cleared upon selection of the data file, and the access to the area C is disabled.

The collation statuses of key data in the application data files $22_1$ and $22_2$ are effective for only an access to an area in an identical application data file.

The key data X4 of the application data file $22_1$ and the key data Y4 of the application data file $22_2$ are added with identical identification data (KID). When the identification data is designated, since one of these application data files serves as an object to be accessed, these key data will not be confused. However identical identification data (KID) is not used between the common data file and the other application data files. Note that this also applies to the identification data (AID) given to an area.

In the identical application data file, since the identification data (AID) and identification data (KID) can be uniquely determined depending on the instruction data, they can employ an identical value.

The number of collation status confirmation data given to each area can be changed in correspondence with the numbers of instructions and processing operations for the area.

In this manner, a plurality of key data (identification numbers) are stored in the data memory, so that at least one key data is used for determining whether or not an access is enabled in the common data file and all of the application data files, and at least another key data is used for determining whether or not an access is enabled in a specific application data file and the common data file. Thus, different key data can be set in correspondence with a plurality of application data files. Therefore, flexible design can be allowed while maintaining security as an IC card system.

A storage section for a collation result of key data registered for the common data file and a storage section for storing a collation result of key data registered for the application data file are separated. When the application data file is selected, the latter collation result is set in a non-collation status, so that a plurality of applications are simultaneously executed. In addition, if key data are set in correspondence with applications, given key data is effective for an access only when a corresponding application is selected. Thus, security among applications can be assured.

What is claimed is:

1. A portable electronic apparatus comprising:
a memory comprising a first region which can be accessed by all of a plurality of applications and second regions which are selectively accessed in accordance with a corresponding one of the applications, the memory storing a plurality of key data;
control means for accessing said memory means and selectively exchanging data with an external device;

means for enabling access to the first region and all of the second regions by the control means in response to at least one first key data of the plurality of key data; and means for causing at least one second key data of the plurality of key data to determine an access enable/disable judgement for the first region and a specific region of the second regions, thereby determining said access by the control means.

2. An apparatus according to claim 1, wherein the first key data is stored in the first region, and the second key data is stored in the second regions.

3. A portable electronic apparatus comprising:

a memory comprising a first region which can be accessed by all of a plurality of applications and second regions which are selectively accessed in accordance with a corresponding one of the applications, the memory storing a plurality of key data;

control means for accessing said memory and selectively inputting/outputting data to an external device;

first and second collation means for collating at least one first key data and at least one second key data of the plurality of key data, respectively;

first and second storage means for storing collation results by said first and second collation means, respectively;

means for determining on the basis of the collation results stored in said first and second storage means whether an access to said memory is enabled; and means for setting the collation result stored in said second storage means to a non-collation status when one of the first and second regions is selected.

4. An apparatus according to claim 3, wherein the first key data is stored in the first region, and the second key data is stored in the second regions.

* * * * *